United States Patent
Yoshimura et al.

(10) Patent No.: US 11,993,713 B2
(45) Date of Patent: May 28, 2024

(54) POLYAMIDE RESIN COMPOSITION AND METHOD FOR PRODUCING SAME

(71) Applicant: TOYOBO CO., LTD., Osaka (JP)

(72) Inventors: Nobuhiro Yoshimura, Shiga (JP); Ryo Umeki, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 505 days.

(21) Appl. No.: 17/421,203

(22) PCT Filed: Jan. 21, 2020

(86) PCT No.: PCT/JP2020/001857
§ 371 (c)(1),
(2) Date: Jul. 7, 2021

(87) PCT Pub. No.: WO2020/158498
PCT Pub. Date: Aug. 6, 2020

(65) Prior Publication Data
US 2022/0081563 A1    Mar. 17, 2022

(30) Foreign Application Priority Data

Jan. 30, 2019  (JP) ................ 2019-014292

(51) Int. Cl.
*C08L 77/02* (2006.01)
*C08K 3/34* (2006.01)
*C08K 7/14* (2006.01)
*C08L 77/06* (2006.01)

(52) U.S. Cl.
CPC .............. *C08L 77/06* (2013.01); *C08K 3/34* (2013.01); *C08K 7/14* (2013.01); *C08L 77/02* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 6,534,583 B1 * | 3/2003 | Tamura | C08L 77/06 524/538 |
| 2003/0125440 A1 | 7/2003 | Tamura et al. | |
| 2003/0125481 A1 | 7/2003 | Tamura et al. | |
| 2011/0263777 A1 * | 10/2011 | Nakagawa | C08L 77/02 524/492 |
| 2018/0371185 A1 | 12/2018 | Tanaka et al. | |
| 2022/0289972 A1 | 9/2022 | Yoshimura et al. | |
| 2023/0104768 A1 | 4/2023 | Yoshimura et al. | |

FOREIGN PATENT DOCUMENTS

| | | |
|---|---|---|
| CN | 108291086 | 7/2018 |
| EP | 0 337 443 | 10/1989 |
| EP | 3 889 213 | 10/2021 |
| JP | 1-263151 | 10/1989 |
| JP | 2-140265 | 5/1990 |
| JP | 3-9952 | 1/1991 |
| JP | 3-269056 | 11/1991 |
| JP | 4-202358 | 7/1992 |
| JP | 6-145345 | 5/1994 |
| JP | 2000-154316 | 6/2000 |
| JP | 2002-69295 | 3/2002 |
| JP | 2002-97363 | 4/2002 |
| JP | 2004-315606 | 11/2004 |
| JP | 2005-239800 | 9/2005 |
| JP | 2005239800 A * | 9/2005 |
| JP | 2010-13571 | 1/2010 |
| JP | 2011-057977 | 3/2011 |
| WO | 2010/087192 | 8/2010 |
| WO | 2017/094696 | 6/2017 |

OTHER PUBLICATIONS

Office Action issued Oct. 19, 2023 in Chinese Patent Application No. 202180009814.X with English translation.
International Search Report (ISR) issued Apr. 14, 2020 in International (PCT) Application No. PCT/JP2020/001857.
Extended European Search Report issued Sep. 23, 2022 in European Patent Application No. 20749218.2.
International Search Report issued Mar. 30, 2021 in International (PCT) Application No. PCT/JP2021/001652.
International Preliminary Report on Patentability issued Jul. 26, 2022 in International (PCT) Application No. PCT/JP2021/001652.
International Search Report (ISR) issued Feb. 10, 2020 in International (PCT) Application No. PCT/JP2019/045924.
Extended European Search Report issued Jul. 7, 2022 in European Patent Application No. 19889910.6.
Office Action issued Jun. 29, 2022 in Chinese Patent Application No. 201980076314.0, with English language translation.
Office Action issued Dec. 2, 2022 in Taiwanese Patent Application No. 108142870, with English-language translation.

(Continued)

*Primary Examiner* — Richard A Huhn
(74) *Attorney, Agent, or Firm* — Wenderoth, Lind & Ponack, L.L.P.

(57) ABSTRACT

The present invention provides a polyamide resin composition containing (A) a crystalline polyamide resin containing a polycapramide resin as a main component, (B) a semi-aromatic amorphous polyamide resin, and (C) an inorganic reinforcing material, wherein the polyamide resin composition contains, as the (C), (C-1) a glass fiber, (C-2) a wollastonite having a needle shape, and (C-3) an inorganic reinforcing material of a plate-like crystal; a mass ratio of the (B) to (A) satisfies $0.35 \leq (B)/(A) \leq 0.80$; when a total content of the (A), (B), and (C) is 100 parts by mass, a content (parts) of each component satisfies $30 \leq (A)+(B) \leq 55$; $10 \leq (B) \leq 23$; $20 \leq (C-1) \leq 40$; $8 \leq (C-2) \leq 25$; $8 \leq (C-3) \leq 25$; $45 \leq (C-1)+(C-2)+(C-3) \leq 70$; and an amount of a carboxyl group in the polyamide resin composition is less than 120 meq/kg. The resin composition provides a molded article having excellent strength and rigidity, excellent surface appearance of the molded article, and further excellent weather resistance, even in continuous molding of the composition over a long period of time at a high cylinder temperature.

4 Claims, No Drawings

(56) References Cited

OTHER PUBLICATIONS

Office Action issued Apr. 20, 2023 in Chinese Patent Application No. 202180009814.X, with English translation.
Extended European Search Report issued Jan. 18, 2024, in European Patent Application No. 21744526.1.
Office Action issued Jan. 31, 2024, in Taiwanese Patent Application No. 110102036, with English translation.
Office Action issued Feb. 28, 2024, in the Korean Patent Application No. 10-2022-7025283, with English translation.

\* cited by examiner

US 11,993,713 B2

POLYAMIDE RESIN COMPOSITION AND METHOD FOR PRODUCING SAME

TECHNICAL FIELD

The present invention relates to a polyamide resin composition containing a polycapramide resin, a semi-aromatic amorphous polyamide resin, and an inorganic reinforcing material as a main component, and further containing carbon black and a copper compound. The polyamide resin composition of the present invention can provide a molded article having excellent strength and rigidity, excellent surface appearance of the molded article (specular glossiness of the surface, surface uniformity of the embossed surface, and the like), and further excellent weather resistance, even in continuous molding of a composition over a long period of time. The polyamide resin composition of the present invention is particularly suitable for automobile interior and exterior parts such as door mirror parts and console parts.

BACKGROUND ART

Generally, polyamide resins, which are excellent in mechanical characteristics, heat resistance, impact resistance, and chemical resistance, are widely used for automobile parts, electrical parts, electronic parts, sundry goods for household use, and the like. Among polyamide resins, a polyamide resin, to which an inorganic reinforcing material represented by glass fiber is added, is known to exhibit significantly improved rigidity, strength, and heat resistance, and particularly exhibit rigidity improved proportional to the added amount of the inorganic reinforcing material.

However, when a large amount of 50 to 70% by mass of a reinforcing material such as glass fiber is added to a polyamide resin for improving rigidity and strength, appearance of a molded article (specular glossiness of the surface, surface uniformity of the embossed surface, and the like) extremely deteriorates, impairing the commercial value thereof. In light of this, addition of an amorphous resin to a crystalline polyamide resin has been proposed as a method for improving appearance of the molded article (Patent Documents 1 to 4). In the methods described in these Patent Documents, specular glossiness of the surface, and surface uniformity of the embossed surface are not obtained well. Also, a method of densely packing nylon 66, glass fiber, and mica in a semi-aromatic polyamide resin (MXD-6) to increase strength and rigidity has been known (for example, Patent Document 5). In this case, there may be a need to increase the mold temperature during molding to a high temperature of 135° C., or there may be a case where a favorable appearance of the molded article cannot be obtained even when the temperature is increased to a high temperature.

In view of the above, a polyamide resin composition has been proposed that does not deteriorate appearance of a molded article even when a large amount of 50% by mass or more of an inorganic reinforcing material such as glass fiber is added, by combination of a low-viscosity polycapramide resin and a semi-aromatic amorphous polyamide (Patent Document 6). According to the resin composition disclosed in this Patent Document 6, it becomes possible to obtain substantially good appearance of a molded article, even when the mold temperature during molding is 100° C. or less.

PRIOR ART DOCUMENTS

Patent Documents

Patent Document 1: Japanese Patent Application Laid-Open (JP-A) No. 140265/90
Patent Document 2: Japanese Patent Application Laid-Open (JP-A) No. 9952/91
Patent Document 3: Japanese Patent Application Laid-Open (JP-A) No. 269056/91
Patent Document 4: Japanese Patent Application Laid-Open (JP-A) No. 202358/92
Patent Document 5: Japanese Patent Application Laid-Open (JP-A) No. 263151/89
Patent Document 6: Japanese Patent Application Laid-Open (JP-A) No. 2000-154316

DISCLOSURE OF THE INVENTION

Problem that the Invention is to Solve

However, it is newly revealed that, even with the polyamide resin composition of Patent Document 6 described above, there are the following problems. When the polyamide resin composition contains 50% by mass or more of an inorganic reinforcing material, there is a need to set the cylinder temperature during molding to a high temperature of 280° C. in order to ensure fluidity necessary for molding although the polycapramide resin (melting point, about 230° C.) is used, and thus retention stability is inferior. When molding is carried out over a long period of time in continuous molding or the like, resin remaining in the cylinder of the molding machine deteriorates. The composition containing this deteriorated resin causes a low molecular substance to adhere to the edge of the molded article during molding and delays solidification, and thus gives adverse effect on characteristics such as rigidity, strength, and heat resistance as well as deteriorates appearance of the molded article, such as remaining of trace of an ejection pin. Further, since the polyamide resin composition uses a low-viscosity polycapramide resin, the tendency described above is more significant, leaving a problem in continuous moldability. Moreover, it is revealed that there is a room for improvement in terms of weather resistance of surface appearance of the molded article, such as discoloration of the molded article during long time use, floating or exposure of the reinforcing material on the molded article, and unclear embossed pattern of the molded article.

The present invention has been made in order to solve such problems. An object of the present invention is to provide a resin composition that can provide a molded article having excellent strength and rigidity, excellent surface appearance of the molded article (specular glossiness of the surface, surface uniformity of the embossed surface, and the like), and further excellent weather resistance, and as a result, has a short molding cycle and excellent productivity, even if the resin composition comprises a polycapramide resin having low melting point and low viscosity as a main raw material, and even if the resin composition is subjected to a continuous molding over a long period of time at a high cylinder temperature of the molding machine of 280° C.

Means for Solving the Problem

The present inventors conducted dedicated research on cause and mechanism that decrease retention stability of the polyamide composition of Patent Document 6 described above. As a result, the present inventors found that amide exchange reaction between polycapramide and semi-aromatic amorphous polyamide lowers the crystallization temperature of the polyamide resin composition, and thus delays solidification. Further, the present inventors found a polyamide resin composition that can provide a molded article having a higher level of surface appearance and further having excellent weather resistance of the surface appearance by blending specific amounts of carbon black and a copper compound, and thus completed the present invention.

Thus, the present invention is as follows.

[1] A polyamide resin composition containing (A) a crystalline polyamide resin containing a polycapramide resin as a main component, (B) a semi-aromatic amorphous polyamide resin, and (C) an inorganic reinforcing material, wherein the polyamide resin composition contains, as the (C) inorganic reinforcing material, (C-1) a glass fiber, (C-2) a wollastonite having a needle shape, and (C-3) an inorganic reinforcing material of a plate-like crystal;

a mass ratio of the (B) to (A) satisfies 0.35≤(B)/(A)≤0.80;

when a total content of the (A), (B), and (C) is 100 parts by mass, a content of each component satisfies the following relationship, 30 parts by mass≤$(A)+(B)$≤55 parts by mass 10 parts by mass≤$(B)$≤23 parts by mass 20 parts by mass≤$(C\text{-}1)$≤40 parts by mass 8 parts by mass≤$(C\text{-}2)$≤25 parts by mass 8 parts by mass≤$(C\text{-}3)$≤25 parts by mass 45 parts by mass≤$(C\text{-}1)+(C\text{-}2)+(C\text{-}3)$≤70 parts by mass; and an amount of a carboxyl group in the polyamide resin composition is less than 120 meq/kg.

[2] The polyamide resin composition according to [1], wherein a temperature-decreasing crystallization temperature of the polyamide resin composition as measured by differential scanning calorimetry (DSC) satisfies the following relationship:

180° C.≤$(TC2\text{-}1)$≤185° C.

$(TC2\text{-}1)-(TC2\text{-}2)$≤5° C.

((TC2-1) represents a temperature-decreasing crystallization temperature of the polyamide resin composition at a retention time of 0 minute, and (TC2-2) represents a temperature-decreasing crystallization temperature of the polyamide resin composition which has been retained at 280° C. for 20 minutes).

[3] The polyamide resin composition according to [1] or [2], further containing (D) a master batch of carbon black and (E) a copper compound, wherein when a total content of the (A), (B), and (C) is 100 parts by mass, a content of the (D) is 1 to 5 parts by mass, and a content of the (E) is 0.001 to 0.1 part by mass.

[4] A method for producing the polyamide resin composition according to [3], the method including mixing, in advance, the (A) crystalline polyamide resin containing a polycapramide resin as a main component, the (B) semi-aromatic amorphous polyamide resin, the (D) master batch of carbon black, and a dispersion of the (E) copper compound, feeding the mixture to a hopper part of an extruder, and feeding the (C) inorganic reinforcing material by a side feeding method.

Advantages of the Invention

According to the polyamide resin composition of the present invention, although the resin composition comprises a polycapramide resin having low melting point and low viscosity as a main raw material, a molded article can be provided having excellent strength and rigidity, excellent surface appearance of the molded article (specular glossiness of the surface, surface uniformity of the embossed surface, and the like), and further excellent weather resistance, even in continuous molding over a long period of time at a high temperature of 280° C. As a result, the resin composition of the present invention can be said to have a short molding cycle and excellent productivity.

BEST MODE FOR CARRYING OUT THE INVENTION

Hereinafter, the present invention will be described in more detail. First, components used in the present invention will be described.

In the present invention, whether the polyamide resin is crystalline or amorphous is determined as follows. A polyamide resin exhibiting a clear melting point peak is crystalline and a polyamide resin not exhibiting a clear melting point peak is amorphous when a polyamide resin is measured by DSC in accordance with JIS K 7121:2012 at a temperature elevation rate of 20° C./min.

Unless otherwise noted, the content (blend amount) of each component of the polyamide resin composition of the present invention is represented by an amount when the total of (A) crystalline polyamide resin containing a polycapramide resin as a main component, (B) semi-aromatic amorphous polyamide resin, and (C) inorganic reinforcing material is 100 parts by mass.

The component (A) in the present invention is a crystalline polyamide resin containing a polycapramide resin as a main component. The polycapramide resin is usually called nylon 6, and is obtained by polymerization of ε-caprolactam. The relative viscosity of the polycapramide resin in the present invention (96% sulfuric acid method) is preferably in a range of 1.7 to 2.2. It is especially preferably in a range of 1.9 to 2.1. When the relative viscosity falls within this range, toughness and fluidity as resin (desired appearance of the molded article can be obtained by fluidity) can be satisfied. However, it is realistic to control the melt mass flow rate of the polyamide resin composition rather than control the relative viscosity of the polycapramide resin.

The amount of terminal carboxyl group of the polycapramide resin of the present invention is preferably less than 140 meq/kg and more preferably less than 120 meq/kg. The lower limit of the amount of terminal carboxyl group of the polycapramide resin is preferably 0 meq/kg, but excessive condition setting may be required for this. The substantially preferable lower limit of the amount of terminal carboxyl group of the polycapramide resin is 10 meq/kg.

The content of polycapramide resin in the component (A) is preferably 70% by mass or more, more preferably 80% by mass or more, and further preferably 90% by mass or more. The content of polycapramide resin in the component (A) may be 100% by mass. The crystalline polyamide resin that may be contained as the component (A) other than polycapramide resin is not particularly limited. Examples thereof include polytetramethyleneadipamide (polyamide 46), polyhexamethyleneadipamide (polyamide 66), polyundecamethyleneadipamide (polyamide 116), polymetaxylileneadipamide (polyamide MXD6), polyparaxylileneadipamide (polyamide PXD6), polytetramethylenesebacamide (polyamide 410), polyhexamethylenesebacamide (polyamide 610), polydecamethyleneadipamide (polyamide 106), polydecamethylenesebacamide (polyamide 1010), polyhexamethylenedodecamide (polyamide 612), polydecamethylenedodecamide (polyamide 1012), polyhexamethyleneisophthalamide (polyamide 6I), polytetramethyleneterephthalamide (polyamide 4T), polypentamethyleneterephthalamide (polyamide 5T), and poly-2-methylpentamethyleneterephthalamide (polyamide M-5T), polyhexamethyleneterephthalamide (polyamide 6T), polyhexamethylenehexahydroterephthalamide (polyamide 6T(H)), polynonamethyleneterephthalamide (polyamide 9T), polydecamethyleneterephthalamide (polyamide 10T), polyundecamethyleneterephthalamide (polyamide 11T), polydodecamethyleneterephthalamide (polyamide 12T), polylauryllactam (polyamide 12), poly-11-amino undecanoic acid (polyamide 11), and copolymers of these constituent units. These constituent units may also be a copolymer unit in the polycapramide resin.

The component (B) in the present invention is a semi-aromatic amorphous polyamide resin in which an aromatic component is contained in either a diamine component or a dicarboxylic acid component. Examples of the dicarboxylic acid include terephthalic acid, isophthalic acid, adipic acid, and sebacic acid. Examples of the diamine include tetramethylene diamine, hexamethylene diamine, meta-xylilene diamine, para-xylylenediamine, undecamethylene diamine, dodecamethylene diamine, 2-methylpentamethylenediamine, trimethylhexamethylenediamine, aminoethyl piperazine, and bis(aminomethyl)cyclohexane. Among these, preferred is polyamide 6T/6I in which terephthalic acid, isophthalic acid, and hexamethylenediamine are used as a raw material.

The relative viscosity of the semi-aromatic amorphous polyamide resin (96% sulfuric acid method) is not particularly limited, but is preferably in a range of 1.8 to 2.4 and more preferably in a range of 1.9 to 2.2.

The amount of terminal carboxyl group of the semi-aromatic amorphous polyamide resin of the present invention is preferably less than 140 meq/kg and more preferably less than 120 meq/kg. The lower limit of the amount of terminal carboxyl group of the semi-aromatic amorphous polyamide resin is preferably 0 meq/kg, but excessive condition setting may be required for this. The substantially preferable lower limit of the amount of terminal carboxyl group of the semi-aromatic amorphous polyamide resin is 10 meq/kg.

The total content of the component (A) and the component (B) is 30 to 55 parts by mass, preferably 30 to 50 parts by mass, and more preferably 35 to 45 parts by mass. The content of the component (B) is 10 to 23 parts by mass and preferably 13 to 22 parts by mass. When the content of the component (B) is less than 10 parts by mass, a favorable appearance of the molded article with a higher level cannot be obtained. In contrast, when the content of the component (B) is more than 23 parts by mass, crystal solidification of the molded article deteriorates, causing a failure of mold releasing during molding, or causing reduction in heat rigidity. The content of the component (A) is not particularly limited as long as the content of the component (B) is considered, but is preferably 20 to 34 parts by mass and more preferably 21 to 32 parts by mass.

Further, in the present invention, the mass ratio of the component (B) to the component (A) needs to satisfy the following relationship.

$$0.35 \leq (B)/(A) \leq 0.80$$

In the present invention, when the mass ratio (B)/(A) falls within this range, favorable appearance of the molded article with a higher level can be obtained. The mass ratio (B)/(A) is preferred to be 0.45 or higher and 0.75 or less, and more preferred to be 0.55 or higher and 0.75 or less.

The component (C) in the present invention is an inorganic reinforcing material and contains (C-1) a glass fiber, (C-2) a wollastonite having a needle shape, and (C-3) an inorganic reinforcing material of a plate-like crystal. Examples of the (C-3) inorganic reinforcing material include mica, talc, and uncalcined clay, among which mica and talc are preferable, and mica is more preferable. As the component (C), a fiber inorganic reinforcing material such as whisker, carbon fiber, and ceramic fiber, or a powder inorganic reinforcing material such as silica, alumina, kaolin, quartz, powder glass (milled fiber), and graphite may be contained as long as the effect of the present invention is not inhibited. Those subjected surface treatment such as aminosilane treatment may be used for these inorganic reinforcing materials.

As the above (C-1) glass fiber, a typical glass fiber whose average diameter of the cross-section is about 4 to 20 μm and cut length is about 3 to 6 mm can be used. The average fiber length of the glass fiber in the molded article decreases in a processing step (compounding step/molding step) and becomes 150 to 300 μm. The content of the (C-1) glass fiber is 20 to 40 parts by mass and preferably 25 to 35 parts by mass. When the content of the (C-1) is less than 20 parts by mass, strength and rigidity are low, whereas the content is more than 40 parts by mass, it is difficult to obtain favorable appearance of the molded article.

The above (C-2) wollastonite having a needle shape is a wollastonite whose average diameter of the cross-section is about 3 to 40 μm and average fiber length is about 20 to 180 μm. The content of the (C-2) wollastonite having a needle shape is 8 to 25 parts by mass, preferably 8 to 20 parts by mass, and more preferably 13 to 20 parts by mass. When the content of the (C-2) is less than 8 parts by mass, strength and rigidity is low, whereas the content is more than 25 parts by mass, it is difficult to obtain favorable appearance of the molded article.

Examples of the above (C-3) inorganic reinforcing material of a plate-like crystal include talc, mica, and uncalcined clay, and the shape thereof is a form like a fish scale. The content of the (C-3) is 8 to 25 parts by mass, preferably 10 to 25 parts by mass, and more preferably 13 to 20 parts by mass. When the content of the (C-3) is less than 8 parts by mass, strength and rigidity is low, whereas the content is more than 25 parts by mass, it is difficult to obtain favorable appearance of the molded article. In the (C-3) inorganic reinforcing material of a plate-like crystal, mica is particularly excellent in terms of strength and rigidity.

The content of the component (C) inorganic reinforcing material is 45 to 70 parts by mass, preferably 50 to 70 parts by mass, and more preferably 55 to 65 parts by mass. When the content of the component (C) is less than 45 parts by mass, strength and rigidity is low, whereas the content is more than 70 parts by mass, it is difficult to obtain favorable appearance and strength of the molded article. When the (C-1) is contained in a range of 20 to 40 parts by mass, and the (C-2) is contained in a range of 8 to 25 parts by mass, and the (C-3) is contained in a range of 8 to 25 parts by mass, as the component (C), strength rigidity is excellent, and further, surface appearance (specular glossiness of the surface, and surface uniformity of the embossed surface) of the molded article is excellent.

The component (C) all exhibits reinforcing effect in the polyamide resin composition. In the component (C), the (C-1) glass fiber provides the highest reinforcing effect, but exhibits significant warpage deformation of the molded article. The (C-2) wollastonite having a needle shape and the (C-3) inorganic reinforcing material of a plate-like crystal do not exhibit reinforcing effect as high as that of glass fiber, but has a smaller aspect ratio than that of glass fiber, and thus has an advantage of having small warpage deformation. Further, the wollastonite having a needle shape can contribute to prevention of sink marks after molding. By appropriately combining these components, a resin composition can be produced that does not cause significant deformation after molding even when the reinforcing material is blended at high concentration.

Typically, a reinforced polyamide resin composition, to which glass fiber, wollastonite, and the like are blended at high concentration, has poor weather resistance and causes exposure of the reinforcing material. However, in the present invention, weather resistance can be controlled by combining a carbon black master batch and a copper compound described below, thus enabling to prevent exposure of the reinforcing material.

The component (D) in the present invention is a master batch of carbon black, and is preferably those which are formed by using, as a base resin, LD-PE (low-density polyethylene) or AS resin (acrylonitrile-styrene copolymer) compatible with polyamide resin, and in which 30 to 60% by mass of carbon black is contained in the master batch. Use of these master batches provides effect of excellent dispersibility of carbon black and excellent working environment. In addition to this, effect of suppressing floating, exposure, or the like of glass fiber and other inorganic reinforcing materials is high. Thus, effect of improving weather resistance of appearance of the molded article is exhibited. The content of master batch of carbon black is preferably 1 to 5 parts by mass and more preferably 2 to 4 parts by mass. The content of carbon black is preferably 0.5 to 3.0 parts by mass and more preferably 1 to 2 parts by mass. When the content of carbon black is more than 3.0 parts by mass, mechanical characteristics may decrease.

The component (E) in the present invention is a copper compound, and is not particularly limited as long as it is a compound containing copper. Examples thereof include copper halides (copper iodide, cuprous bromide, cupric bromide, and cuprous chloride, for example), copper acetate, copper propionate, copper benzoate, copper adipate, copper terephthalate, copper isophthalate, copper salicylate, copper nicotinate, and copper stearate, and copper complex salts in which a chelating agent such as ethylene diamine and ethylene diamine tetraacetic acid is coordinated to copper. One type of these may be used alone, or two or more thereof may be used in combination.

Among the copper compounds exemplified above, the component (E) is preferably halogenated copper, and more preferably one or more types selected from the group consisting of copper iodide, cuprous bromide, cupric bromide, and cuprous chloride. The component (E) is further preferably one or more types selected from the group consisting of copper iodide, cuprous bromide, and cupric bromide, and especially preferably cupric bromide. Use of the above copper compound enables to provide a polyamide resin composition having excellent weather resistance.

The content of the component (E) is preferably 0.001 to 0.1 part by mass and more preferably 0.01 to 0.05 part by mass. When the component (E) is added in an amount of more than 0.1 part by mass, metal corrosive properties and the risk of discoloration increase.

Since the content of the component (E) is small, the component (E) is preferably blended by being dissolved or dispersed in a liquid component which is liquid at room temperature, or blended in the form of a master batch. The liquid component is not particularly limited as long as it adheres to resin pellets and exhibits effect that the uniformly mixed state of different types of resin pellets prevents the same types of resin pellets from gathering, that is, suppresses segregation, but water is the most convenient.

In the polyamide resin composition of the present invention, the melt mass flow rate at a moisture content of 0.05% (0.05% by mass) or less is preferably 4.0 g/10 min or more and less than 13.0 g/10 min. The melt mass flow rate (MFR) is a value measured at a temperature of 275° C. and a load of 2,160 g in accordance with JIS K 7210-1:2014.

When the melt mass flow rate is less than 4.0 g/10 min, a favorable appearance of the molded article cannot be obtained in some cases. In order to obtain a polyamide resin composition having a melt mass flow rate of 4.0 g/10 min or more, when a crystalline polyamide resin having a relative viscosity of 2.3 or more, which is usually used, is used, the melt mass flow rate does not reach the above described range of the melt mass flow rate (less than 4.0 g/10 min) in some cases. It is therefore favorable to use a crystalline polyamide resin having ultra-low viscosity (relative viscosity: 1.7 to 2.2) or employ formulation such as adding a molecular chain cutting agent of polyamide resin during compounding processing. As the molecular chain cutting agent of the polyamide resin (also referred to as a viscosity reducing agent), aliphatic dicarboxylic acid, aromatic dicarboxylic acid, and the like are effective. Specific examples thereof include oxalic acid, malonic acid, succinic acid, adipic acid, azelaic acid, sebacic acid, phthalate, and terephthalic acid, but are not limited thereto. When the molecular chain cutting agent is added (contained), by setting the added amount thereof to around 0.1 to 3 parts by mass per the 100 parts by mass total of the components (A), (B), (C), and (D) of the present invention, the melt mass flow rate of the composition of the present invention becomes 4.0 g/10 min or more. However, the effect of the molecular chain cutting agent varies depending on the compound processing condition. Naturally, higher processing temperature or longer polymer retention time during compounding results in excellent effect. Usually, the compounding processing temperature is typically in a range of 240 to 300° C., and the polymer retention time during compounding is typically within 15 to 60 seconds.

When the melt viscosity of resin is low, there is a possibility that causes draw-down or difficulty in measurement during injection molding. When the melt mass flow rate is 13.0 g/10 min or more, there is a possibility that the range of the molding condition during injection molding becomes narrow.

The amount of carboxyl group in the polyamide resin composition of the present invention is an amount of carboxyl group present per mass excluding insoluble components when a polyamide resin composition is dissolved in the following solvent, and is less than 120 meq/kg, preferably less than 110 meq/kg. The amount of carboxyl group is a calculated value obtained by dissolving a polyamide resin composition in $CDCl_3$/HFIP-h (1/1: capacity ratio), performing centrifugation, and then measuring the supernatant by using an $^1$H-NMR apparatus. Here, the solvent is a mixed solvent having a capacity ratio of CDCl₃ (deuterochloroform) to HFIP-h (hexafluoroisopropanol) of 1:1. The amount of the carboxyl group is preferably 100 meq/kg or less, and more preferably 90 meq/kg or less. The lower limit of the amount of carboxyl group in the polyamide resin composition is preferably 0 meq/kg, but excessive condition setting may be required for this. The substantially preferable lower limit of the amount of carboxyl group in the polyamide resin composition is 10 meq/kg.

When the amount of carboxyl group is 120 meq/kg or more, the solidification of the polyamide resin composition delays over time during continuous molding. This makes the trace of the election pin deep to deteriorate appearance, or delays the molding cycle to decrease productivity, and further causes decrease in strength and rigidity. The cause of this is deterioration of resin due to retaining of resin during molding at a molding temperature much higher than the melting point. In addition to the above, it is conceived that when the amount of carboxyl group is more than the above specified amount, amide exchange proceeds in the polycapramide and semi-aromatic amorphous polyamide resin, and thus the solidification temperature of the polyamide resin composition decreases.

As a method for adjusting the amount of carboxyl group in the polyamide resin composition of the present invention to less than 120 meq/kg, known methods can be employed that can change the amount of carboxyl group terminal, such as the amount of adipic acid to be added to ε-caprolactam, the blend ratio of a terminal-blocking agent, and reaction conditions such as reaction time.

A temperature-decreasing crystallization temperature (TC2) of the polyamide resin composition of the present invention as measured by differential scanning calorimetry (DSC) is preferred to be 180° C.≤(TC2)≤185° C. In measuring the temperature-decreasing crystallization temperature (TC2), a DSC measuring device (manufactured by Seiko Instruments Inc., EXSTAR6000) was used. The temperature (TC2) was raised to 300° C. under a nitrogen flow at a temperature elevation rate of 20° C./min, and maintained at this temperature for 5 minutes. Then, the peak top of the exothermic peak when the temperature was decreased to 100° C. at a rate of 10° C./min was defined as TC2. Here, TC2 represents a temperature-decreasing crystallization temperature (TC2-1) at a retention time of 0 minute as described later.

When the temperature-decreasing crystallization temperature (TC2) does not satisfy 180° C.≤(TC2)≤185° C., a higher level of favorable appearance of the molded article cannot be obtained due to crystallization speed of the polyamide resin composition in some cases.

Further, when (TC2-1) which is the temperature-decreasing crystallization temperature (TC2) at a retention time of 0 minute and (TC2-2) which is TC2 of the polyamide resin composition which has been retained at 280° C. for 20 minutes do not satisfy (TC2-1)−(TC2-2)≤5° C., a polyamide resin composition that can endure continuous molding over a long period of time cannot be obtained in some cases.

To the polyamide resin composition of the present invention, a heat resistance stabilizer, an antioxidant, a UV absorbent, a photostabilizer, a plasticizer, a lubricant, a nucleating agent, a mold release agent, an anti-static agent, a flame retardant, a pigment, a dye, or various types of other polymers can be added as necessary. The polyamide resin composition of the present invention is preferably 90% by mass or more, and more preferably 95% by mass or more of the total of the components (A), (B), (C), (D), and (E). The components (A), (B), and (C) are essential components, and the components (D) and (E) are optional components.

The method for producing a polyamide resin composition of the present invention is not particularly limited as long as it is a melt-kneading extrusion method that is capable of accurately controlling the blend amount of each of the components in the present invention to the above predetermined range, but it is preferable to use a single screw extruder or twin screw extruder.

When resin pellets having a greatly different shape, apparent gravity, friction coefficient of resin pellets to be blended are fed from a hopper part of the extruder, it is preferable to employ the method including mixing, in advance, the (A) crystalline polyamide resin containing a polycapramide resin as a main component, the (B) semi-aromatic amorphous polyamide resin, the (D) master batch of carbon black, and a dispersion of the (E) copper compound, feeding the mixture to a hopper part of an extruder, and feeding (C-1) a glass fiber, (C-2) a wollastonite having a needle shape, and (C-3) an inorganic reinforcing material of a plate-like crystal as the (C) inorganic reinforcing material by a side feeding method. The dispersion of the copper compound includes a solution in which a copper compound is dissolved in a solvent.

A liquid component containing the component (E) can suppress gradual separation/segregation of the components (A), (B), and (D) due to their very weak adhesive force. Thus, in a case of a greater difference in the shape, apparent gravity, friction coefficient of pellets of each of the components, the effect of the present invention is exhibited.

EXAMPLES

The present invention will now be more specifically illustrated by way of Examples although the present invention is never limited to those Examples.

Incidentally, each of the characteristics and properties mentioned in Examples and Comparative Examples below was measured by the following test methods.

1) Melt mass flow rate (MFR): resin composition pellets were dried to a moisture content of 0.05% or less by a heat dryer, and then measured at a temperature of 275° C. and a load of 2,160 g in accordance with JIS K 7210-1:2014.

2) Temperature-decreasing crystallization temperature (TC2): a DSC measuring device (manufactured by Seiko Instruments Inc., EXSTAR6000) was used. The temperature was raised to 300° C. under a nitrogen flow at a temperature elevation rate of 20° C./min, and maintained at this temperature for 5 minutes. Then, the peak top of the exothermic peak when the temperature was decreased to 100° C. at a rate of 10° C./min was defined as TC2.

3) Temperature-decreasing crystallization temperature (TC2) after being retained: a resin composition was retained in the injection molding machine (manufactured by Toshiba Machine Co., Ltd., IS80) at a cylinder temperature of 280° C. for a predetermined time. Then, the TC2 of a sample cut out from the center portion of a plate having a size of 100 mm×100 mm×3 mm, molded at a mold temperature of 90° C. was measured by the following method. A case where the resin composition is retained for 0 minute is TC2-1, and a case where the resin composition is retained for 20 minutes is TC2-2.

4) Amount of carboxyl group: a sample was dissolved in CDCl₃/HFIP-h (1/1: capacity ratio) (temperature: 35°

C., 1 hour) and then centrifuged. Two drops of heavy formic acid were added to the supernatant, and this was subjected to $^1$H-NMR measurement. The sample was cut out from a portion around the center of the plate having a size of 100 mm×100 mm×3 mm, which has been retained for 0 minute as described in the above 3). From the obtained $^1$H-NMR analysis, the amount of carboxyl group was calculated by using the mass of the polyamide resin composition dissolved in the solvent as a reference, from the peak intensities of CH and $CH_2$ at the α position or the β position of the carboxyl group. The measurement conditions of $^1$H-NMR are as follows.

[NMR Measurement]

Apparatus: Fourier transform nuclear magnetic resonance system (AVANCE-NEO, manufactured by BRUKER)

$^1$H resonance frequency: 600.13 MHz

Flip angle of detection pulse: 45°

Data capturing time: 4 seconds

Delay time: 1 second

Number of scans: 50 to 200 times

Measurement temperature: room temperature

5) Flexural strength: a flexural strength was measured in accordance with JIS K 7171:2016.
6) Flexural modulus: a flexural modulus was measured in accordance with JIS K 7171:2016.
7) Continuous moldability: continuous injection molding was performed by an injection molding machine (manufactured by Toshiba Machine Co., Ltd., IS80) at a cylinder temperature of 280° C. and a molding temperature of 90° C. for cycle time of 80 seconds. The HDT (load deflection temperature), the specular glossiness, and the election pin depth of molded articles at 5th shot, 50th shot, and 120th shot were evaluated.
8) HDT: the load deflection temperature under a load of 1.82 Mpa was measured in accordance with JIS K 7191-2:2015.
9) Election pin depth: an ASTM flexural test piece (depth direction: width 6 mm) was molded, and the election pin depth was measured by a digital thickness meter.
10) Specular glossiness: using a mirror-finished mold having a size of 100 mm×100 mm×3 mm (thickness), a molded article was produced at a resin temperature of 280° C. and a molding temperature of 80° C. Then, the glossiness at an incident angle of 60 degrees was measured in accordance with JIS Z-8714 (a higher numerical value indicates better glossiness).

The measurement results for glossiness were denoted as "glossiness of 95 or more: ○, glossiness of less than 95 and 90 or more: Δ, and glossiness of less than 90: x".

11) Color difference ΔE: a textured flat plate (100 mm×100 mm×2 mm) molded by an injection molding machine (IS 80 manufactured by Toshiba Machinery) adopting a cylinder temperature of 280° C. and a metal mold temperature of 90° C. was subjected to a weathering test in accordance with JIS K 7350-2 using a xenon weatherometer (XL 75 manufactured by Suga Shikenki KK) under the following conditions:

black panel temperature: 63±2° C.

relative humidity: 50±5% irradiation method: rainfall for 18 minutes during 120 minutes (being sprinkled with water)

irradiation time: 1250 hours irradiation degree: 60 W/m$^2$.S with 300 to 400 nm wavelength optical filters: quartz (inside) and borosilicate #275 (outside).

For the textured flat plate before and after the weathering test, value of "L", "a" and "b" were measured using TC-1500 SX (spectrophotometer manufactured by Tokyo Denshoku) whereupon the color difference ΔE was calculated.

12) Surface appearance of the molded product after the weathering test (to check whether a reinforcement material was exposed): for the textured flat plate after the weathering test as described in the above 11), it was visually checked according to the following criteria:

○: No exposing of the reinforcement material was noted.

x: Exposing of the reinforcement material was noted.

13) State of textures on the surface of the molded product after the weathering test: for the textured flat plate after the weathering test as described in the above 11), it was visually checked according to the following criteria:

○: Textured pattern was clearly noted.

Δ: Textured pattern was somewhat noted.

x: Textured pattern could not be confirmed.

Synthesis Examples of Polycapramides A1 to A4

21 kg of ε-caprolactam, 0.42 kg of water, and adipic acid whose added amount has been changed were charged into a solubilizing tank. After nitrogen substitution, the tank was closed. The temperature was raised to 260° C. with stirring, and initial polymerization was performed under pressure for 1.5 hours. Then, the pressure in the tank was returned to the atmospheric pressure, and reaction was performed in this state under normal pressure for 2.5 hours. Then, the pressure was reduced to 30 torr, and the reaction was performed for 2 hours. After completion of the reaction, the stirring was stopped, followed by defoaming. Then, the pressure was restored with nitrogen. The obtained polyamide resin was cut into strands and then extracted with hot water to remove monomers or oligomers, followed by vacuum drying. Thus, polycapramides A1 to A4 were obtained.

Polycapramide A1: relative viscosity: 2.0, terminal carboxyl group: 23 meq/kg

Polycapramide A2: relative viscosity: 2.0, terminal carboxyl group: 53 meq/kg

Polycapramide A3: relative viscosity: 2.0, terminal carboxyl group: 98 meq/kg

Polycapramide A4: relative viscosity: 2.0, terminal carboxyl group: 159 meq/kg

Other raw materials used in Examples and Comparative Examples are as follows.

(B) semi-aromatic amorphous polyamide resin: Hexamethylene terephthalamide/hexamethylene isophthalamide (6T/6I resin), G21, manufactured by EMS, relative viscosity: 2.1, terminal carboxyl group amount: 78 meq/kg (C-1) glass fiber: ECS03T-275H, manufactured by Nippon Electric Glass Co., Ltd., fiber diameter: 10 μm, cut length: 3.0 mm (C-2) wollastonite having a needle shape: NYGLOS-8, manufactured by NYCO, average fiber diameter: 8 μm, average fiber length: 136 μm (C-3) inorganic reinforcing material of a plate-like crystal: Mica, S-325, manufactured by Repco Inc., average particle diameter: 18 μm, average aspect ratio: 20

(D) master batch of carbon black: ABF-T-9801, manufactured by Resino Color Industry Co., Ltd., base resin: AS resin, containing 45% by mass of carbon black (E) copper compound: cupric bromide Examples 1 to 12 and Comparative Examples 1 to 4

As the copper compound, an aqueous solution of cupric bromide was made and used. Respective raw materials other than inorganic reinforcing materials, which have been mixed in advance, were fed from a hopper part of a twin screw extruder at the composition as shown in Tables 1 and 2. Respective reinforcing materials were fed from a side feeder of the twin screw extruder. Compounding was performed at a cylinder temperature of the twin screw extruder of 280° C., a screw rotation speed of 180 rpm to produce pellets. The obtained pellets were dried to a moisture content of 0.05% or less by a hot wind dryer, and then various characteristics were evaluated. Evaluation results are shown in Tables 1 and 2. A weather resistance test was performed for Examples 6 to 10 and Comparative Example 4, which contain the components (D) and (E), and Example 1 and Comparative Example 1 for comparison.

TABLE 1

| | | Unit | Example 1 | Example 2 | Example 3 |
|---|---|---|---|---|---|
| Compositions | (A): polycapramide A1 | parts by mass | | 26 | |
| | (A): polycapramide A2 | parts by mass | 26 | | |
| | (A): polycapramide A3 | parts by mass | | | 26 |
| | (A): polycapramide A4 | parts by mass | | | |
| | (B): 6T/6I resin | parts by mass | 14 | 14 | 14 |
| | (C-1): glass fiber | parts by mass | 30 | 30 | 30 |
| | (C-2): wollastonite having needle shape | parts by mass | 15 | 15 | 15 |
| | (C-3): mica | parts by mass | 15 | 15 | 15 |
| | (D): master batch of carbon black | parts by mass | | | |
| | (E): cupric bromide | parts by mass | | | |
| | (B)/(A) | — | 0.61 | 0.61 | 0.61 |
| | (A) + (B) | parts by mass | 40 | 40 | 40 |
| | (C-1) + (C-2) + (C-3) | parts by mass | 60 | 60 | 60 |
| Characteristics of compositions | amount of carboxyl group | meq/kg | 57 | 39 | 88 |
| | temperature-decreasing crystallization temperature | (a) retention time of 0 minute | ° C. | 182.0 | 182.0 | 182.0 |
| | | (b) after being retained for 10 minutes | ° C. | 181.5 | 181.6 | 181.4 |
| | | (c) after being retained for 20 minutes | ° C. | 178.7 | 180.3 | 177.1 |
| | (a) − (c) | ° C. | 3.3 | 1.7 | 4.9 |
| | MFR | g/10 min | 9.0 | 12.0 | 7.9 |
| Evaluation results | flexural strength | MPa | 250 | 250 | 250 |
| | flexural modulus | GPa | 18.5 | 18.5 | 18.5 |
| | continuous moldability (HDT) | at 5th shot | ° C. | 183 | 183 | 183 |
| | | at 50th shot | ° C. | 183 | 183 | 182 |
| | | at 120th shot | ° C. | 182 | 182 | 182 |
| | continuous moldability (election pin depth) | at 5th shot | mm | 0.2 | 0.2 | 0.2 |
| | | at 50th shot | mm | 0.2 | 0.2 | 0.2 |
| | | at 120th shot | mm | 0.2 | 0.2 | 0.2 |
| | continuous moldability (specular glossiness) | at 5th shot | — | 98 (○) | 98 (○) | 98 (○) |
| | | at 50th shot | — | 97 (○) | 97 (○) | 97 (○) |
| | | at 120th shot | — | 97 (○) | 97 (○) | 97 (○) |
| | color difference ΔE after weathering test | — | 7.0 | — | — |
| | check whether reinforcement material was lifted after weathering test | — | x | — | — |
| | State of textures after weathering test | — | x | — | — |

| | | Unit | Example 4 | Example 5 | Example 6 |
|---|---|---|---|---|---|
| Compositions | (A): polycapramide A1 | parts by mass | | | |
| | (A): polycapramide A2 | parts by mass | 23 | 29 | 26 |
| | (A): polycapramide A3 | parts by mass | | | |
| | (A): polycapramide A4 | parts by mass | | | |
| | (B): 6T/6I resin | parts by mass | 17 | 11 | 14 |
| | (C-1): glass fiber | parts by mass | 30 | 30 | 30 |
| | (C-2): wollastonite having needle shape | parts by mass | 15 | 15 | 15 |
| | (C-3): mica | parts by mass | 15 | 15 | 15 |
| | (D): master batch of carbon black | parts by mass | | | |
| | (E): cupric bromide | parts by mass | | | 0.02 |
| | (B)/(A) | — | 0.74 | 0.38 | 0.61 |
| | (A) + (B) | parts by mass | 40 | 40 | 40 |
| | (C-1) + (C-2) + (C-3) | parts by mass | 60 | 60 | 60 |
| Characteristics of compositions | amount of carboxyl group | meq/kg | 62 | 54 | 57 |
| | temperature-decreasing crystallization temperature | (a) retention time of 0 minute | ° C. | 180.0 | 184.0 | 182.0 |
| | | (b) after being retained for 10 minutes | ° C. | 178.2 | 182.8 | 181.6 |

TABLE 1-continued

|  |  |  | Unit |  |  |  |
|---|---|---|---|---|---|---|
|  |  | (c) after being retained for 20 minutes | °C. | 175.8 | 182.2 | 180.5 |
|  |  | (a) − (c) | °C. | 4.2 | 1.8 | 1.5 |
|  | MFR |  | g/10 min | 7.2 | 11.4 | 9.0 |
| Evaluation results | flexural strength |  | MPa | 256 | 250 | 250 |
|  | flexural modulus |  | GPa | 18.8 | 18.5 | 18.5 |
|  | continuous moldability (HDT) | at 5th shot | °C. | 181 | 184 | 183 |
|  |  | at 50th shot | °C. | 180 | 184 | 183 |
|  |  | at 120th shot | °C. | 179 | 183 | 183 |
|  | continuous moldability (election pin depth) | at 5th shot | mm | 0.2 | 0.2 | 0.2 |
|  |  | at 50th shot | mm | 0.2 | 0.2 | 0.2 |
|  |  | at 120th shot | mm | 0.2 | 0.2 | 0.2 |
|  | continuous moldability (specular glossiness) | at 5th shot | — | 98 (○) | 91 (Δ) | 98 (○) |
|  |  | at 50th shot | — | 97 (○) | 90 (Δ) | 97 (○) |
|  |  | at 120th shot | — | 97 (○) | 90 (Δ) | 97 (○) |
|  | color difference ΔE after weathering test |  | — | — | — | 5.5 |
|  | check whether reinforcement material was lifted after weathering test |  | — | — | — | ○ |
|  | State of textures after weathering test |  | — | — | — | x |

|  |  |  | Unit | Example 7 | Example 8 |
|---|---|---|---|---|---|
| Compositions | (A): polycapramide A1 |  | parts by mass |  |  |
|  | (A): polycapramide A2 |  | parts by mass | 26 | 26 |
|  | (A): polycapramide A3 |  | parts by mass |  |  |
|  | (A): polycapramide A4 |  | parts by mass |  |  |
|  | (B): 6T/6I resin |  | parts by mass | 14 | 14 |
|  | (C-1): glass fiber |  | parts by mass | 30 | 30 |
|  | (C-2): wollastonite having needle shape |  | parts by mass | 15 | 15 |
|  | (C-3): mica |  | parts by mass | 15 | 15 |
|  | (D): master batch of carbon black |  | parts by mass | 3 | 3 |
|  | (E): cupric bromide |  | parts by mass |  | 0.02 |
|  | (B)/(A) |  | — | 0.61 | 0.61 |
|  | (A) + (B) |  | parts by mass | 40 | 40 |
|  | (C-1) + (C-2) + (C-3) |  | parts by mass | 60 | 60 |
| Characteristics of compositions | amount of carboxyl group |  | meq/kg | 59 | 59 |
|  | temperature-decreasing crystallization temperature | (a) retention time of 0 minute | °C. | 182.0 | 182.0 |
|  |  | (b) after being retained for 10 minutes | °C. | 181.1 | 181.3 |
|  |  | (c) after being retained for 20 minutes | °C. | 177.9 | 178.2 |
|  | (a) − (c) |  | °C. | 4.1 | 3.8 |
|  | MFR |  | g/10 min | 9.4 | 9.3 |
| Evaluation results | flexural strength |  | MPa | 240 | 240 |
|  | flexural modulus |  | GPa | 18.0 | 18.0 |
|  | continuous moldability (HDT) | at 5th shot | °C. | 182 | 182 |
|  |  | at 50th shot | °C. | 181 | 181 |
|  |  | at 120th shot | °C. | 181 | 181 |
|  | continuous moldability (election pin depth) | at 5th shot | mm | 0.2 | 0.2 |
|  |  | at 50th shot | mm | 0.2 | 0.2 |
|  |  | at 120th shot | mm | 0.2 | 0.2 |
|  | continuous moldability (specular glossiness) | at 5th shot | — | 98 (○) | 98 (○) |
|  |  | at 50th shot | — | 97 (○) | 97 (○) |
|  |  | at 120th shot | — | 97 (○) | 97 (○) |
|  | color difference ΔE after weathering test |  | — | 5.0 | 4.0 |
|  | check whether reinforcement material was lifted after weathering test |  | — | ○ | ○ |
|  | State of textures after weathering test |  | — | x | ○ |

TABLE 2

|  |  | Unit | Example 9 | Example 10 | Example 11 |
|---|---|---|---|---|---|
| Compositions | (A): polycapramide A1 | parts by mass |  |  | 26 |
|  | (A): polycapramide A2 | parts by mass | 26 | 26 |  |
|  | (A): polycapramide A3 | parts by mass |  |  |  |
|  | (A): polycapramide A4 | parts by mass |  |  |  |
|  | (B): 6T/6I resin | parts by mass | 14 | 14 | 14 |
|  | (C-1): glass fiber | parts by mass | 30 | 30 | 30 |
|  | (C-2): wollastonite having needle shape | parts by mass | 15 | 15 | 9 |

TABLE 2-continued

|  |  |  | Unit |  |  |  |
|---|---|---|---|---|---|---|
|  | (C-3): mica |  | parts by mass | 15 | 15 | 21 |
|  | (D): master batch of carbon black |  | parts by mass | 3 | 4.5 |  |
|  | (E): cupric bromide |  | parts by mass | 0.04 | 0.02 |  |
|  | (B)/(A) |  | — | 0.61 | 0.61 | 0.61 |
|  | (A) + (B) |  | parts by mass | 40 | 40 | 40 |
|  | (C-1) + (C-2) + (C-3) |  | parts by mass | 60 | 60 | 60 |
| Characteristics of compositions | amount of carboxyl group |  | meq/kg | 59 | 59 | 39 |
|  | temperature-decreasing crystallization temperature | (a) retention time of 0 minute | °C. | 182.0 | 182.0 | 182.0 |
|  |  | (b) after being retained for 10 minutes | °C. | 181.3 | 181.3 | 181.6 |
|  |  | (c) after being retained for 20 minutes | °C. | 178.2 | 178.2 | 180.3 |
|  | (a) − (c) |  | °C. | 3.8 | 3.8 | 1.7 |
|  | MFR |  | g/10 min | 9.3 | 9.3 | 14.0 |
| Evaluation results | flexural strength |  | MPa | 240 | 230 | 230 |
|  | flexural modulus |  | GPa | 18.0 | 17.5 | 17.0 |
|  | continuous moldability (HDT) | at 5th shot | °C. | 182 | 181 | 180 |
|  |  | at 50th shot | °C. | 181 | 180 | 179 |
|  |  | at 120th shot | °C. | 181 | 180 | 179 |
|  | continuous moldability (election pin depth) | at 5th shot | mm | 0.2 | 0.2 | 0.2 |
|  |  | at 50th shot | mm | 0.2 | 0.2 | 0.2 |
|  |  | at 120th shot | mm | 0.2 | 0.2 | 0.2 |
|  | continuous moldability (specular glossiness) | at 5th shot | — | 98 (o) | 98 (o) | 98 (o) |
|  |  | at 50th shot | — | 97 (o) | 97 (o) | 97 (o) |
|  |  | at 120th shot | — | 97 (o) | 97 (o) | 97 (o) |
|  | color difference ΔE after weathering test |  | — | 2.0 | 1.8 | — |
|  | check whether reinforcement material was lifted after weathering test |  | — | o | o | — |
|  | State of textures after weathering test |  | — | o | o | — |

|  |  |  | Unit | Example 12 | Comparative Example 1 | Comparative Example 2 |
|---|---|---|---|---|---|---|
| Compositions | (A): polycapramide A1 |  | parts by mass |  |  |  |
|  | (A): polycapramide A2 |  | parts by mass |  |  | 21 |
|  | (A): polycapramide A3 |  | parts by mass | 23 |  |  |
|  | (A): polycapramide A4 |  | parts by mass |  | 26 |  |
|  | (B): 6T/6I resin |  | parts by mass | 12 | 14 | 19 |
|  | (C-1): glass fiber |  | parts by mass | 36 | 30 | 30 |
|  | (C-2): wollastonite having needle shape |  | parts by mass | 9 | 15 | 15 |
|  | (C-3): mica |  | parts by mass | 20 | 15 | 15 |
|  | (D): master batch of carbon black |  | parts by mass |  |  |  |
|  | (E): cupric bromide |  | parts by mass |  |  |  |
|  | (B)/(A) |  | - | 0.61 | 0.61 | 0.90 |
|  | (A) + (B) |  | parts by mass | 35 | 40 | 40 |
|  | (C-1) + (C-2) + (C-3) |  | parts by mass | 65 | 60 | 60 |
| Characteristics of compositions | amount of carboxyl group |  | meq/kg | 88 | 131 | 63 |
|  | temperature-decreasing crystallization temperature | (a) retention time of 0 minute | °C. | 182.0 | 182.0 | 171.0 |
|  |  | (b) after being retained for 10 minutes | °C. | 181.4 | 176.2 | 168.4 |
|  |  | (c) after being retained for 20 minutes | °C. | 177.1 | 168.6 | 166.1 |
|  | (a) − (c) |  | °C. | 4.9 | 13.4 | 4.9 |
|  | MFR |  | g/10 min | 6.8 | 10.5 | 5.2 |
| Evaluation results | flexural strength |  | MPa | 270 | 250 | 263 |
|  | flexural modulus |  | GPa | 19.0 | 18.5 | 19.1 |
|  | continuous moldability (HDT) | at 5th shot | °C. | 184 | 183 | 81 |
|  |  | at 50th shot | °C. | 183 | 132 | 79 |
|  |  | at 120th shot | °C. | 183 | 121 | 78 |
|  | continuous moldability (election pin depth) | at 5th shot | mm | 0.2 | 0.2 | 1.1 |
|  |  | at 50th shot | mm | 0.2 | 0.7 | 1.1 |
|  |  | at 120th shot | mm | 0.2 | 0.8 | 1.2 |
|  | continuous moldability (specular glossiness) | at 5th shot | — | 98 (o) | 98 (o) | 77 (x) |
|  |  | at 50th shot | — | 97 (o) | 83 (x) | 76 (x) |
|  |  | at 120th shot | — | 97 (o) | 82 (x) | 76 (x) |
|  | color difference ΔE after weathering test |  | — | — | 8.5 | — |
|  | check whether reinforcement material was lifted after weathering test |  | — | — | x | — |
|  | State of textures after weathering test |  | — | — | x | — |

TABLE 2-continued

| | | Unit | Comparative Example 3 | Comparative Example 4 |
|---|---|---|---|---|
| Compositions | (A): polycapramide A1 | parts by mass | | |
| | (A): polycapramide A2 | parts by mass | 31 | |
| | (A): polycapramide A3 | parts by mass | | |
| | (A): polycapramide A4 | parts by mass | | 26 |
| | (B): 6T/6I resin | parts by mass | 9 | 14 |
| | (C-1): glass fiber | parts by mass | 30 | 30 |
| | (C-2): wollastonite having needle shape | parts by mass | 15 | 15 |
| | (C-3): mica | parts by mass | 15 | 15 |
| | (D): master batch of carbon black | parts by mass | | 3 |
| | (E): cupric bromide | parts by mass | | 0.02 |
| | (B)/(A) | — | 0.29 | 0.61 |
| | (A) + (B) | parts by mass | 40 | 40 |
| | (C-1) + (C-2) + (C-3) | parts by mass | 60 | 60 |
| Characteristics of compositions | amount of carboxyl group | meq/kg | 55 | 133 |
| | temperature-decreasing crystallization temperature | (a) retention time of 0 minute | °C. | 186.0 | 182.0 |
| | | (b) after being retained for 10 minutes | °C. | 184.6 | 175.8 |
| | | (c) after being retained for 20 minutes | °C. | 184.0 | 166.2 |
| | (a) − (c) | °C. | 2.0 | 15.8 |
| | MFR | g/10 min | 11.0 | 10.8 |
| Evaluation results | flexural strength | MPa | 236 | 240 |
| | flexural modulus | GPa | 17.8 | 18.0 |
| | continuous moldability (HDT) | at 5th shot | °C. | 186 | 182 |
| | | at 50th shot | °C. | 185 | 131 |
| | | at 120th shot | °C. | 185 | 120 |
| | continuous moldability (election pin depth) | at 5th shot | mm | 0.2 | 0.2 |
| | | at 50th shot | mm | 0.2 | 0.7 |
| | | at 120th shot | mm | 0.2 | 0.8 |
| | continuous moldability (specular glossiness) | at 5th shot | — | 85 (x) | 98 (o) |
| | | at 50th shot | — | 85 (x) | 83 (x) |
| | | at 120th shot | — | 85 (x) | 82 (x) |
| | color difference ΔE after weathering test | — | — | 5.5 |
| | check whether reinforcement material was lifted after weathering test | — | — | o |
| | State of textures after weathering test | — | — | Δ |

The results of Tables 1 and 2 show that Examples 1 to 12 result in small decrease in HDT in continuous molding in the first stage and final stage of the molding, and leaves almost no trace of the election pin, and thus can provide a molded article having very high specular glossiness and a higher level of appearance. On the other hand, Comparative Examples 1 and 4, in which the amount of carboxyl group was outside the amount specified, result in significant decrease in HDT during continuous molding and deteriorated appearance. In Comparative Example 2, in which the ratio of (B)/(A) is outside the upper limit, the crystallization temperature is low, and thus HDT and appearance deteriorated, and in Comparative Example 3, in which the ratio of (B)/(A) is outside the lower limit, the crystallization speed was too fast, causing a failure of mold transcription and thus deteriorating specular glossiness.

The results also show that, in Examples 8 to 10, in which a copper compound and carbon black are combined at predetermined amounts, color difference after the weather resistance test, exposure of the reinforcing material, the state of the embossed pattern are also extremely excellent, and durability and weather resistance of the surface appearance of the molded article are excellent. In contrast, in Comparative Example 4, the amount of carboxyl group is outside the amount specified, and thus is inferior in weather resistance compared to Examples 8 to 10.

INDUSTRIAL APPLICABILITY

According to the polyamide resin composition of the present invention, a molded article can be provided having excellent balance between strength and surface appearance and further excellent weather resistance, even in continuous molding over a long period of time, and can be suitably used in the field of engineering plastics such as automobile, electrical, electronic parts.

The invention claimed is:

1. A polyamide resin composition containing (A) a crystalline polyamide resin containing a polycapramide resin as a main component, (B) a semi-aromatic amorphous polyamide resin, and (C) an inorganic reinforcing material, wherein
the polyamide resin composition contains, as the (C) inorganic reinforcing material, (C-1) a glass fiber, (C-2) a wollastonite having a needle shape, and (C-3) an inorganic reinforcing material of a plate-like crystal;
a mass ratio of the (B) to (A) satisfies $0.35 \leq (B)/(A) \leq 0.80$;
when a total content of the (A), (B), and (C) is 100 parts by mass, a content of each component satisfies the following relationship, $$30 \text{ parts by mass} \leq (A)+(B) \leq 55 \text{ parts by mass}$$

$$10 \text{ parts by mass} \leq (B) \leq 23 \text{ parts by mass}$$

$$20 \text{ parts by mass} \leq (C\text{-}1) \leq 40 \text{ parts by mass}$$

8 parts by mass≤(C-2)≤25 parts by mass 8 parts by mass≤(C-3)≤25 parts by mass 45 parts by mass≤(C-1)+(C-2)+(C-3)≤70 parts by mass; and an amount of a carboxyl group in the polyamide resin composition is less than 120 meq/kg.

2. The polyamide resin composition according to claim 1, wherein a temperature-decreasing crystallization temperature of the polyamide resin composition as measured by differential scanning calorimetry (DSC) satisfies the following relationship:

180° C.≤(TC2-1)≤185° C.

(TC2-1)−(TC2-2)≤5° C.

((TC2-1) represents a temperature-decreasing crystallization temperature of the polyamide resin composition at a retention time of 0 minute, and (TC2-2) represents a temperature-decreasing crystallization temperature of the polyamide resin composition which has been retained at 280° C. for 20 minutes).

3. The polyamide resin composition according to claim 1, further containing (D) a master batch of carbon black and (E) a copper compound, wherein when a total content of the (A), (B), and (C) is 100 parts by mass, a content of the (D) is 1 to 5 parts by mass, and a content of the (E) is 0.001 to 0.1 part by mass.

4. A method for producing the polyamide resin composition according to claim 3, the method including mixing, in advance, the (A) crystalline polyamide resin containing a polycapramide resin as a main component, the (B) semi-aromatic amorphous polyamide resin, the (D) master batch of carbon black, and a dispersion of the (E) copper compound, feeding the mixture to a hopper part of an extruder, and feeding the (C) inorganic reinforcing material by a side feeding method.

* * * * *